(12) United States Patent
Waterfall

(10) Patent No.: US 8,918,433 B2
(45) Date of Patent: Dec. 23, 2014

(54) IDENTIFYING AND REACTING TO CHANGES IN AN EXTENSIBLE AUTOMATIC RUNTIME OBJECT MANAGEMENT SYSTEM

(75) Inventor: Douglas Waterfall, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/466,897

(22) Filed: May 8, 2012

(65) Prior Publication Data
US 2013/0166604 A1 Jun. 27, 2013

Related U.S. Application Data

(63) Continuation of application No. 12/242,722, filed on Sep. 30, 2008, now Pat. No. 8,195,707.

(51) Int. Cl.
G06F 7/00 (2006.01)
G06F 17/30 (2006.01)

(52) U.S. Cl.
USPC .......................................................... 707/802

(58) Field of Classification Search
USPC .................... 707/690, 790, 802, 803, 609
See application file for complete search history.

(56) References Cited

U.S. PATENT DOCUMENTS

| | | | |
|---|---|---|---|
| 6,023,271 A | 2/2000 | Quaeler-Bock et al. | |
| 6,941,510 B1 | 9/2005 | Ozzie et al. | |
| 6,983,448 B2 | 1/2006 | Hartel et al. | |
| 2002/0144014 A1 | 10/2002 | West | |
| 2003/0115375 A1 * | 6/2003 | Robison | 709/318 |
| 2004/0015936 A1 | 1/2004 | Susarla et al. | |
| 2004/0019670 A1 | 1/2004 | Viswanath | |
| 2004/0187095 A1 * | 9/2004 | Gilfix et al. | 717/120 |
| 2005/0065626 A1 * | 3/2005 | Kappelhoff et al. | 700/97 |
| 2005/0144218 A1 | 6/2005 | Heintz | |
| 2005/0262475 A1 | 11/2005 | Halpern | |
| 2006/0136464 A1 | 6/2006 | Rossmann | |
| 2006/0271557 A1 * | 11/2006 | Harward et al. | 707/10 |
| 2007/0061382 A1 * | 3/2007 | Davis et al. | 707/201 |
| 2008/0320496 A1 * | 12/2008 | Barinov et al. | 719/318 |

OTHER PUBLICATIONS

Liong Ng, "Applying Observer Pattern in .NET Remoting", retrieved from the internet at: http://www.codeproject.com/KB/IP/c_sharp_remoting_aspx, Dec. 2002, published online, 6 pages.

Jason Arber, "Opentype Fonts—Typography in InDesign CS", Computer Arts, Feb. 2004, pp. 59-62.

(Continued)

Primary Examiner — Marc Somers
(74) Attorney, Agent, or Firm — Wolfe-SBMC

(57) ABSTRACT

A method includes receiving input indicating a listener object and an interface for an object class corresponding to a persisted object of an object model retained by a database, where the interface has multiple different implementations within the object model; recording information indicating that the listener object has an interest in persistent data associated with the interface for the object class corresponding to the persisted object; in connection with a transaction with the database and when each of multiple calls is received for the database, checking whether the interface for the object class corresponding to the persisted object is associated with the call, wherein each of the calls alerts the database to changes for data managed by the database; and communicating with the listener object when the interface for the object class corresponding to the persisted object was associated with at least one of the calls during the transaction.

23 Claims, 12 Drawing Sheets

(56) References Cited

OTHER PUBLICATIONS

Wikipedia, "Observer pattern", retrieved from the internet at: http://web.archive.org/web/20080626183000/http:/en.wikipedia.org/wiki/Observer_Pattern, on Dec. 29, 2011, archived page last modified on Jun. 19, 2008, 5 pages.

Sun, "The Singleton Pattern, and the Observer Pattern Tech Tips", retrieved from the internet at http://web.archive.org/web/20080625011459/http:/java.sun.com/developer/JDCTechTips/ . . . , on Dec. 29, 2011, archived page published Jan. 2006, 5 pages.

"Final Office Action", U.S. Appl. No. 12/242,722, (Jan. 10, 2012), 19 pages.

"Non-Final Office Action", U.S. Appl. No. 12/242,722, (Oct. 3, 2011), 14 pages.

"Notice of Allowance", U.S. Appl. No. 12/242,722, (Mar. 7, 2012), 7 pages.

* cited by examiner

IDENTIFYING AND REACTING TO CHANGES IN AN EXTENSIBLE AUTOMATIC RUNTIME OBJECT MANAGEMENT SYSTEM

CROSS REFERENCE TO RELATED APPLICATIONS

This application is a continuation application of, and claims the benefit of priority to, U.S. application Ser. No. 12/242,722, filed Sep. 30, 2008; the disclosure of the prior application is considered part of (and is incorporated by reference in) the disclosure of this application.

BACKGROUND

The present disclosure relates to managing changes to persistent data in third party extensible object management architectures.

An extensible object management architecture provides a software platform on which third party developers can build. Such developers can enhance and extend the architecture by adding new objects and commands. The INDESIGN® software (provided by Adobe Systems Incorporated of San Jose, Calif.) is an example of an extensible automatic runtime object management system, which enables the design and production of professional page layouts. This example system is one in which a command based scheme is used to make changes to objects within the system.

A developer for such an extensible object management system often needs prior knowledge regarding which commands may result in changes to any given persistent object interface, which can pose difficulties for developers who are unaware of changes that can occur as a result of commands built by third party developers. A traditional approach to this problem is to employ a subject-observer mechanism, where other code can be kept informed of potentially relevant changes to objects within the system through the use of an observer who watches for commands that are known to target an object of interest. When a command that is known to affect an object of interest (i.e., because of the nature of the command itself) is seen, the observer can initiate an appropriate reaction to that command, which reaction will vary with the object, the command and the particular implementation.

However, when new commands are added by one developer, problems can occur since other developers may have no knowledge of the new commands. In an attempt to address this issue, some functionality has been added to allow a command to broadcast a notification regarding the general nature of the command, which notification the observers would then see. Thus, the observers might be informed in a general, summary fashion of the types of objects and interfaces the new command affects.

SUMMARY

This specification describes technologies relating to extensible automatic runtime object management systems. In general, one aspect of the subject matter described in this specification can be embodied in a method that includes receiving input indicating a listener object and an interface for an object class corresponding to a persisted object of an object model retained by a database, where the interface has multiple different implementations within the object model; recording information indicating that the listener object has an interest in persistent data associated with the interface for the object class corresponding to the persisted object; in connection with a transaction with the database and when each of multiple Dirty( ) calls is received for the database, checking whether the interface for the object class corresponding to the persisted object is associated with the Dirty( ) call; and communicating with the listener object when the interface for the object class corresponding to the persisted object was associated with at least one of the Dirty( ) calls during the transaction. Other embodiments of this aspect include corresponding systems, apparatus, and computer-readable medium encoding computer program products.

These and other embodiments can optionally include one or more of the following features. Each Dirty( ) call can be a PreDirty( ) call, and the method can include, when each PreDirty( ) call is received: checking whether the PreDirty( ) call is a first such call received where the interface for the object class corresponding to the persisted object is associated therewith; and sending a message to the listener object when the PreDirty( ) call is the first such call received for the interface for the object class corresponding to the persisted object; wherein the communicating includes the sending. The communicating can include, when the transaction with the database is completed, notifying the listener object when the interface for the object class corresponding to the persisted object was associated with at least one of the PreDirty( ) calls during the transaction to enable the listener object to react to any change in the persistent data. The listener object can make a private copy of the persistent data from memory in response to the message, and the listener object can compare the private copy with the persistent data in the memory in response to the notifying. Moreover, the transaction can include a root transaction and one or more nested transactions, the notifying can include imparting to the listener object context information indicating one or more messages sent to the listener object during the transaction including the root transaction and the one or more nested transactions, and the notifying can occur at an end phase of the root transaction hut not during any of the one or more nested transactions.

The listener object can include a first listener, the receiving can include receiving input indicating a second listener and a message type for an object class corresponding to an intermediary object, and the method can include: recording information indicating that the second listener has an interest in the message type for the object class corresponding to the intermediary object; receiving a call from the first listener in response to the communicating with the first listener, the received call indicating the message type for the object class corresponding to the intermediary object; and communicating with the second listener in response the received call. In addition, the listener object can include the second listener. Thus, a single listener object can be used to implement multiple logical listeners, or multiple listener objects can be used to implement multiple logical listeners.

Furthermore, the listener object can include a first listener, the persisted object can include a first persisted object, and the method can include: receiving input indicating a second listener and a public interface for an object class corresponding to a second persisted object of the object model retained by the database; recording information indicating that the second listener has an interest in the public interface for the object class corresponding to the second persisted object; in connection with the transaction with the database and when each of the Dirty( ) calls is received for the database, checking whether a private interface for the object class corresponding to the second persisted object is associated with the Dirty( ) call; and communicating with the second listener when the private interface for the object class corresponding to the second persisted object was associated with at least one of the Dirty( ) calls during the transaction.

Particular embodiments of the subject matter described in this specification can be implemented to realize one or more of the following advantages. The process of building dependent subsystems within an extensible automatic runtime object management system can be simplified. Errors can be reduced by increasing the likelihood that dependent changes will be properly observed and reacted to. A subject-observer mechanism that is dependent on prior knowledge of the kinds of commands that would be targeted toward objects (e.g., page items) of interest need not be used. New commands can be readily added to the system without impacting the ability of existing objects in the system to learn about any change to persistent data of interest to such objects. Moreover, in some embodiments, the specific changes that have occurred to a particular piece of persistent data can be readily identified since the listeners can be given an opportunity to make their own local copy of the persistent data before such data is changed by a command.

The total number of reactions to changes in persistent data can be reduced since the dependent object can wait until a whole set of changes have been made before reacting to the changes. This can result in significantly improved performance within the system overall, especially when using long command sequences, such as is often the case with an import command, since a listener need not react to each of multiple types of changes taking place to a single persisted object. Thus, significant duplication of work can be avoided.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
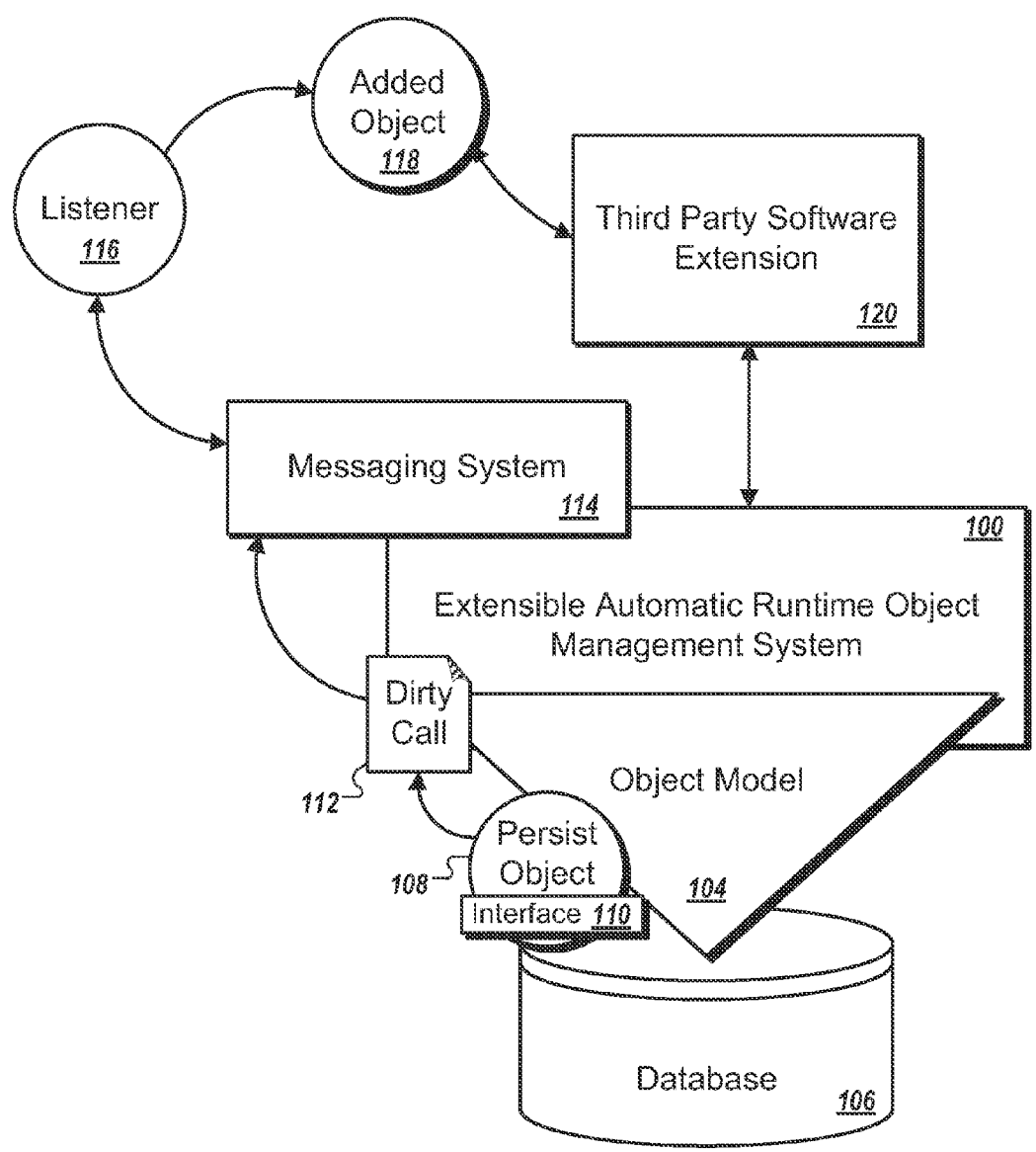
FIG. 1A is a block diagram showing an example conceptual overview of a process of identifying and reacting to changes in an extensible automatic runtime object management system.

FIG. 1A is a block diagram showing an example conceptual overview of a process of identifying and reacting to changes in an extensible automatic runtime object management system 100. An automatic runtime object management system is termed extensible when it can provide a software platform on which third party developers can build onto an existing database system. The extensible automatic runtime object management system 100 supports an architecture in which elements of a database 106, built upon an object model 104, can register with a messaging system 114 to receive notifications regarding changes to persistent data within the database 106. In this way, when third party developers add to the existing database system, the existing database elements can remain synchronized with these changes. In addition, the messaging system 114 provides an architecture in which registered objects can wait until the completion of a set of changes before reacting to the change. This can significantly improve performance within the extensible automatic runtime object management system.

In one example, a third party software extension 120 can add an object 118. The third party software extension 120, for example, can be indicative of a third party vendor which adds capabilities to the database 106. In some implementations, the third party software extension 120 can make both additions and modifications to elements within the object model 104. The added object 118 can have an interest in changes to persistent data associated with a persistent interface 110 of an object class (e.g., an object class defined within the object model 104, upon which one or more objects may be based). An interface is persistent if it preserves its previous state during modification. The messaging system 114, for example, can use the state preservation techniques within persistent interfaces to track changes and generate notifications.

The added object 118 can engage a listener object 116 to listen for changes in persistent data of interest to the added object 118. In some implementations, the listener object 116 is a non-persisted object created by the added object 118. The listener object 116 registers with the messaging system 114 to receive notifications when changes are made to the persistent interface 110. The listener object 116 can then forward the notifications to the added object 118. In receiving these notifications, the added object 118 can learn about changes in persistent data without needing to understand the commands which cause the changes in the persistent data. When the listener object 116 receives one or more notifications from the messaging system 114 regarding changes to the interface 110, for example, the listener object 116 can then notify the added object 118.

The messaging system 114, in some implementations, can provide registered listener objects with enough information to determine which portions of a persistent data field have changed and in which way. In some implementations, the messaging system 114 provides an interested object, through the use of a listener object, with a mechanism to defer reaction to changes until the completion of a chain of transactions, wherein more than one of the transactions in the chain may cause a change to the same persistent data elements.

When a persisted object 108 is undergoing modification, the persisted object 108 submits a Dirty( ) call 112 to the extensible automatic runtime object management system 100. The Dirty( ) call 112 alerts the database 106 to changes with persistent data associated with a persistent interface (e.g., the interface 110) of the persisted object 108. The Dirty( ) call 112, in some implementations, can be issued by the persisted object 108 before persistent data associated with the interface 110 of the persisted object 108 undergoes modification (e.g., a PreDirty( ) call). In another example, the Dirty( ) call 112 can be issued to the database 106 after modifications to the persisted object 108 have been made but before those changes have been made permanent through saving the changes to a long term storage device (e.g., a PostDirty( ) call). The Dirty( ) call 112, for example, can provide the opportunity for the database 106 to allow an undo mechanism to the changes to the persistent data. In some implementations, when the Dirty( ) call 112 is issued, a copy of the persistent data is stored within a cache area.

The messaging system 114 receives the Dirty( ) call 112. In some implementations, rather than directly receiving the Dirty( ) call 112, the messaging system 114 receives a message containing pertinent information from within the Dirty( ) call 112. For example, the Dirty( ) call 112 software routine can include a mechanism for providing information regarding the Dirty( ) call 112 to the messaging system 114. The messaging system 114 checks if the Dirty( ) call 112 relates to information for which there is a registered listener. Because the Dirty( ) call 112 relates to the interface 110, the messaging system 114 communicates with the listener object 116 regarding the Dirty( ) call 112. In some implementations, the messaging system 114 forwards the Dirty( ) call 112 to the listener object 116. In other implementations, the messaging system 114 forwards a message based upon one or more pieces of information obtained from within the Dirty( ) call 112 to the listener object 116.

Upon receipt of the communication from the messaging system 114, the listener object 116 can notify the added object 118 of the changes being made to the persistent data associated with the persisted object 108. In some implementations, the listener object 116 can collect information on behalf of the added object 118 until the completion of a is transaction which includes more than one modification, each modification potentially changing the persistent data associated with the interface 110. In this manner, the added object 118 only needs to react once to a series of changes. In some implementations, the listener object 116 can be listening on behalf of any number of objects within the database 106. Additionally, any number of listener objects can be in communication with the messaging system 114.

Figure 1B:
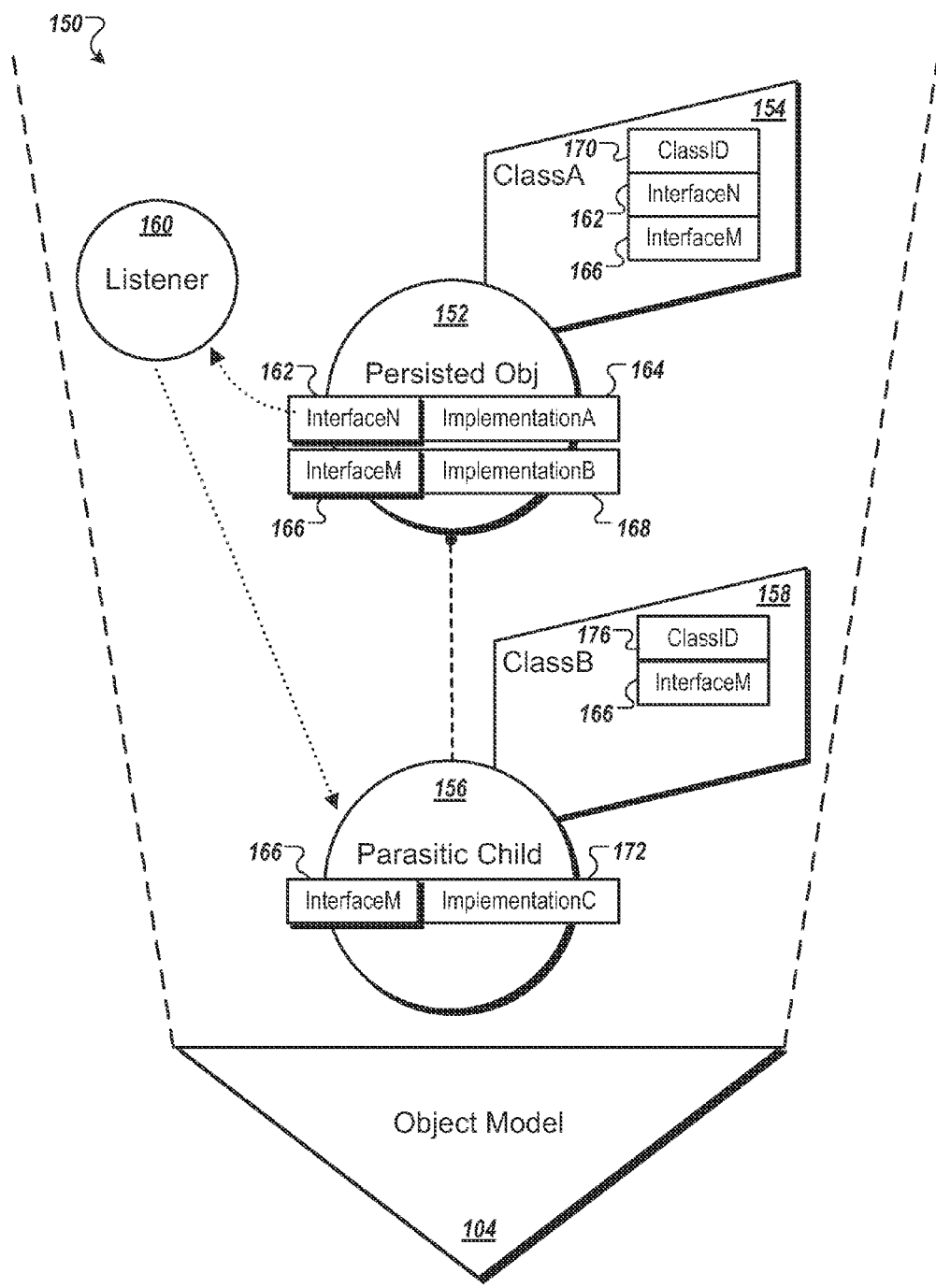
FIG. 1B is a block diagram showing an example object model, including a hierarchy in which a parasitic child object hangs off of a parent object within the object model.

FIG. 1B is a block diagram showing an exemplary portion 150 of the object model 104, including a hierarchy in which a parasitic child object 156 hangs off of a parent object 152 within the object model 104. A child object can be parasitic, in which case the parent object is not aware of the child object. Being unaware of the child object, the parent object would not realize to forward information regarding changes which may affect the child object. The parasitic child object 156 recognizes dependencies with the parent object 152, but the parent object 152 is unaware of these dependencies. In some implementations, the parasitic child object 156 may be generated by a third party software extension (e.g., the third party software extension 120 as described in connection with FIG. 1A). Because the third party software extension 120 is not part of the native database 106 and the native object model 104, the third party software extension 120 may not be capable of creating a child object off of a native parent object and have the native parent object recognize the child object. The child object, in this case the parasitic child object 156, can register a listener object with the messaging system 114 (as shown in FIG. 1A) to be alerted of changes made to the parent object 152 which affect portions of persistent data relevant to the dependency between the parasitic child object 156 and the parent object 152. In this manner, the messaging system 114 can synchronize the dependency between the parasitic child object 156 and the parent object 152.

Both the parasitic child object 156 and the parent object 152 have been created based upon a class definition. The parent object 152 is based upon a class ClassA 154. The class ClassA 154 contains a class identifier ClassID 170, a first interface InterfaceN 162, and a second interface InterfaceM 166. The interfaces InterfaceN 162 and InterfaceM 166 provide command access to modifying objects created based upon the class ClassA 154. The parent object 152 implements the interface InterfaceN 162 as a persistent interface using an implementation method ImplementationA 164. The parent object 152 implements the interface InterfaceM 166 as a persistent interface using a second implementation method ImplementationB 168. In other implementations, the parent object 152 can include both persistent and non-persistent interfaces.

The parasitic child object 156 is based upon a class ClassB 158. The class ClassB 158 contains a class identifier ClassID 176 and the interface InterfaceM 166. Although the parasitic child object 156 shares a same interface InterfaceM 166 as the parent object 152, the parasitic child object 156 implements the interface InterfaceM 166 using an implementation method ImplementationC 172.

A listener 160 has been assigned to the parasitic child object 156 to listen to the interface InterfaceN 162 of the class classA 154. Listener objects can be assigned, in some examples, based upon an expressed interest in a class (e.g., one or more persistent interfaces within class ClassA 154), a persistent interface (e.g., all classes containing interface InterfaceN 162), an implementation (e.g., any persistent interface implemented using the implementation ImplementationB 168), and/or a specific message type. In some implementations, a single listener object can be assigned to listen to more than one class, interface, implementation, and/or message type. When the listener 160 intercepts a message regarding the interface InterfaceN 162, the listener 160 can communicate changes being made to persistent data through the interface InterfaceN 162 to the parasitic child object 156.

The object model 104 can contain any number of classes, persisted objects, and non-persisted objects grouped within any number of object hierarchies. In some implementations, a listener object can be used to communicate changes regarding a persisted object which is not included within the hierarchy of the interested object. The interested object, in some implementations, need not be a persisted object.

Figure 2A:
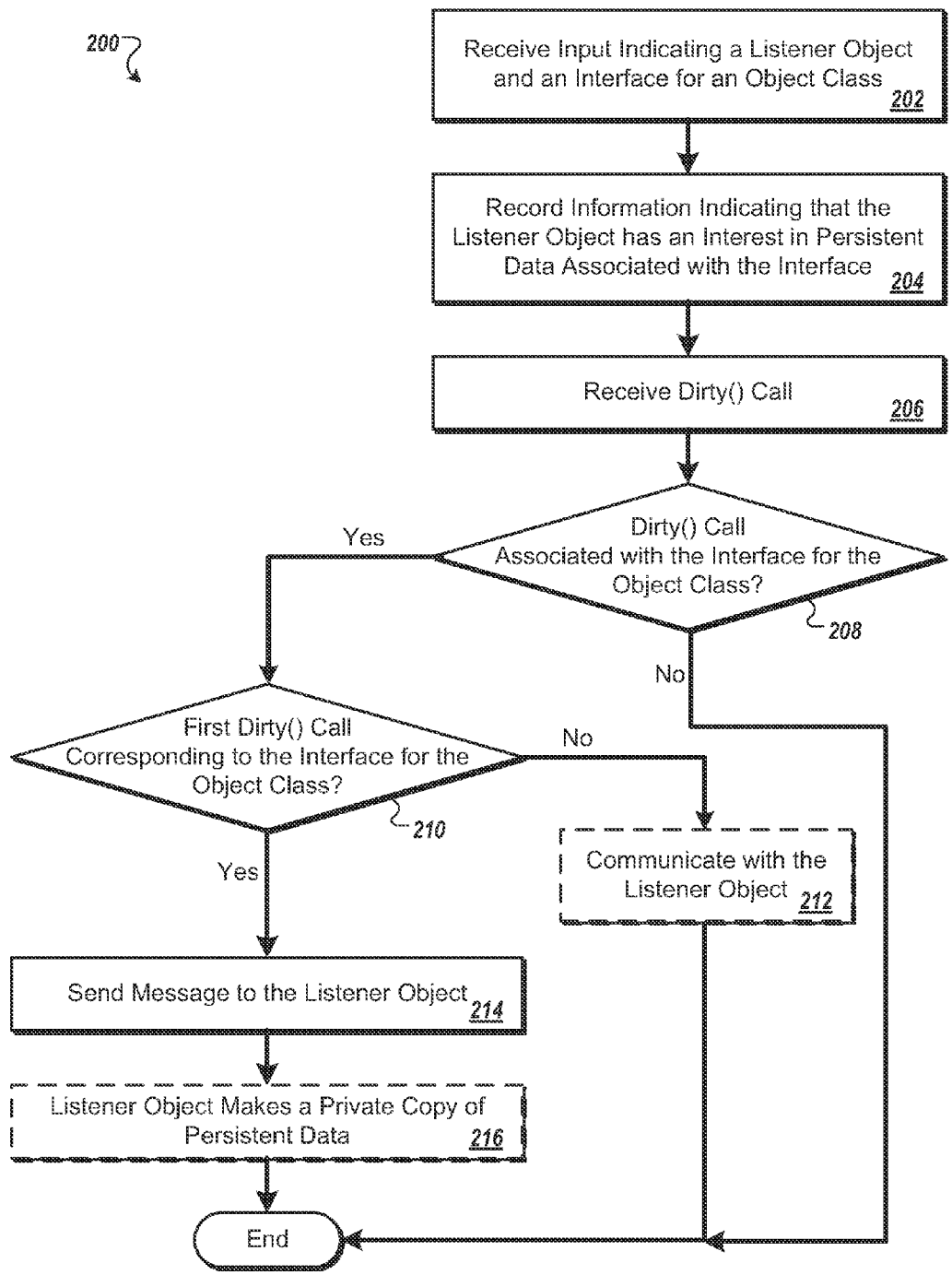
FIGS. 2A and 2B are flowcharts showing another example process of identifying and reacting to changes in an extensible automatic runtime object management system.
Figure 2B:
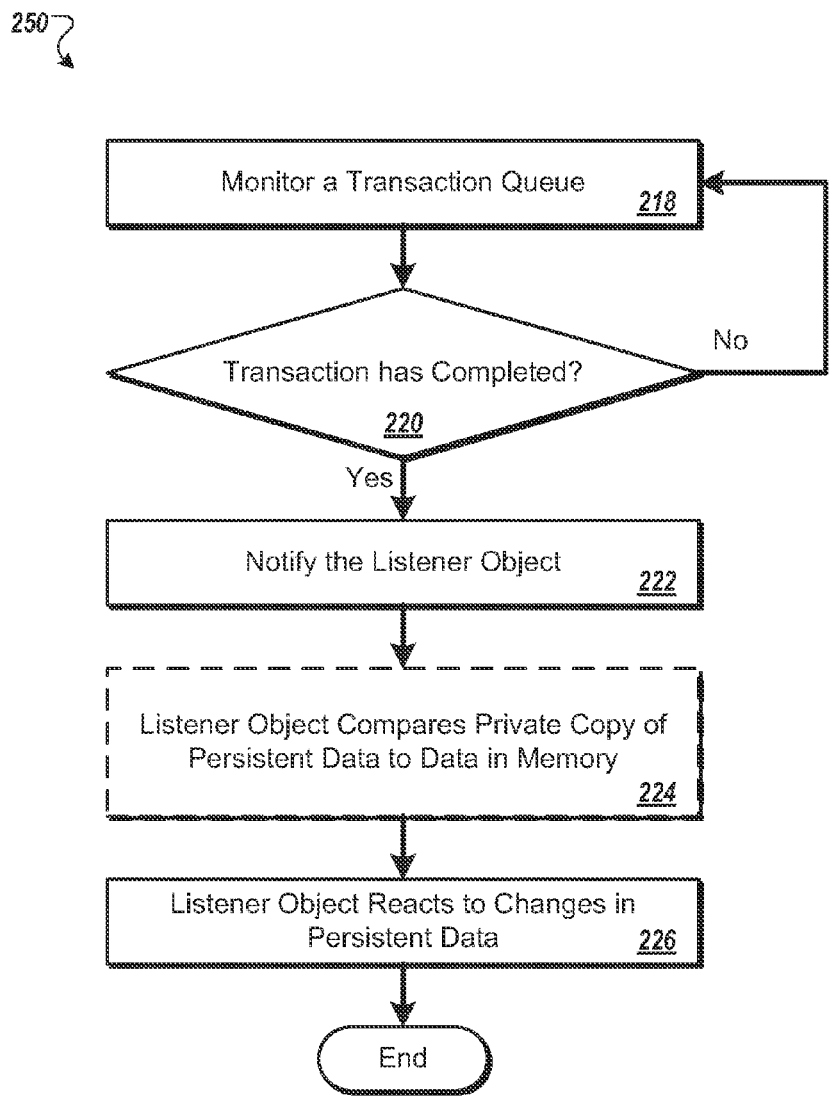

FIGS. 2A and 2B are flowcharts showing another example process of identifying and reacting to changes in an extensible automatic runtime object management system. The process, for example, can be executed within the extensible automatic runtime object management system 100 (as shown in FIG. 1A). The process is broken into two discrete segments. The first process segment 200, as shown in FIG. 2A, includes registration within a messaging system (e.g., the messaging system 114 as shown in FIG. 1A) and the capturing of alerts regarding changes to an interface for an object class.

The process segment 200 begins with receiving input indicating a listener object and an interface for an object class corresponding to a persisted object (202). The persisted object can be included within an object model retained by a database. In some implementations, the interface can have multiple different implementations within the object model. The input can, for example, include registration information regarding an object (e.g., the listener object 116 as shown in FIG. 1A) which has an interest in persistent data associated with the interface 110 of the persisted object 108. The persisted object 108 is included within the object model 104 retained by the database 106. In one example, the messaging system 114 can receive the input from the listener object 116 indicating the listener object 116 and the interface 110. In some implementations, the messaging system 114 can locate listener classes within the object model (e.g., based upon a well-known property associated with any listener type class within the object model) and register each listener object by instantiating an instance of the listener object (e.g., when the database application space is initiated, at the time at which the persistent data of interest is being modified, etc.).

Information is recorded indicating that the listener object has an interest in persistent data associated with the interface (204). For example, the messaging system 114 can record that the listener object 116 has an interest in persistent data associated with the interface 110. The messaging system 114 can additionally record, in some implementations, that the added object 118 is interested in receiving notifications from the listener object 116 regarding changes to persistent data associated with the interface 110.

A Dirty( ) call is received (206). For example, the messaging system 114 can receive the Dirty( ) call 112, originated from the persisted object 108. In some implementations, the software implementation of the Dirty( ) call routine can send a message to the messaging system 114 (e.g., a notification including information regarding the object, interface, implementation, etc. affected by the Dirty( ) call).

If the Dirty( ) call is not associated with the interface for the object class (208), the process segment 200 ends. For example, if the messaging system 114 determines that the Dirty( ) call is not associated with an interface which is being listened to by a listener object, the messaging system 114 can ignore the Dirty( ) call. If however, the Dirty( ) call is associated with the interface for the object class (208), the process segment 200 determines if the Dirty( ) call received is the first Dirty( ) call corresponding to the interface for the object class (210). The first Dirty( ) call, for example, can indicate the beginning of a transaction with the interface for the object class. A set of modifications, referred to as a transaction, can be generated for an interface of an object class. In some implementations, the messaging system 114 can determine the beginning of the transaction (e.g., the root transaction) and differentiate that message from one or more nested transaction messages. For example, when modifying an image within a document, multiple transactions can be issued pertaining to individual features which require modification (e.g., geometry, line widths, etc). Two or more line segment modification transactions, for example, can be included within a root image resizing transaction. Each line segment modification transaction can be termed a nested transaction. With each nested transaction, the object can issue a separate Dirty( ) call.

If the Dirty( ) call received is not the first Dirty( ) call corresponding to the interface for the object class, the process segment 200 can optionally communicate with the listener object (212). In some implementations, if the Dirty( ) call is associated with a nested transaction, the messaging system 114 can collect information associated with the Dirty( ) call. In this manner, the messaging system 114 can generate a summary of nested transactions within a main transaction rather than communicating with the listener object regarding each nested transaction. In other implementations, with each Dirty( ) call, the messaging system 114 can alert the listener object 116.

If the Dirty( ) call received is the first Dirty( ) call corresponding to the interface for the object class, a message is sent to the listener object (214). In some implementations, the Dirty( ) call is perceived as the first Dirty( ) call if the previous information received regarding the interface for the object class was associated with the completion of a transaction (e.g., a finalize or undo call). The messaging system 114, for example, can send a message to the listener object 116 indicating that the interface 110 for the persisted object 108 is about to undergo modification. In the case of a PreDirty( ) call, when the persisted object 108 has not yet undergone any modifications, the listener object 116 can have the opportunity to take a snapshot of the present state of the persistent data that the added object 118 is interested in. The listener object optionally makes a private copy of the persistent data (216). The private copy, for example, can be stored within a data cache. The private copy can be used at the end of the transaction, in some implementations, to make a comparison between the privately stored persistent data and the present state of the persistent data associated with the object. In some implementations, the interested object (e.g., the added object 118) can be notified by the listener object 116 to make a private copy of the persistent data. Alternatively, the listener object 116 can make a private copy of the persistent data and communicate the private copy to the added object 118 for storage. In some implementations, the listener object 116 and/or the added object 118 can make a private copy only of those values within the persistent data that the added object 118 is interested in. For example, the added object 118 may be interested only in persistent data values pertaining to the geometric sizing of the persisted object 108.

The second process segment 250, as shown in FIG. 2B, includes monitoring for the completion of a transaction made to the interface of the object class and communicating the completion to the listener. The second process segment 250 begins when the first process segment 200 determines that a received Dirty( ) call corresponding to the interface for the object class is the first Dirty( ) call received (210).

Figure 3:
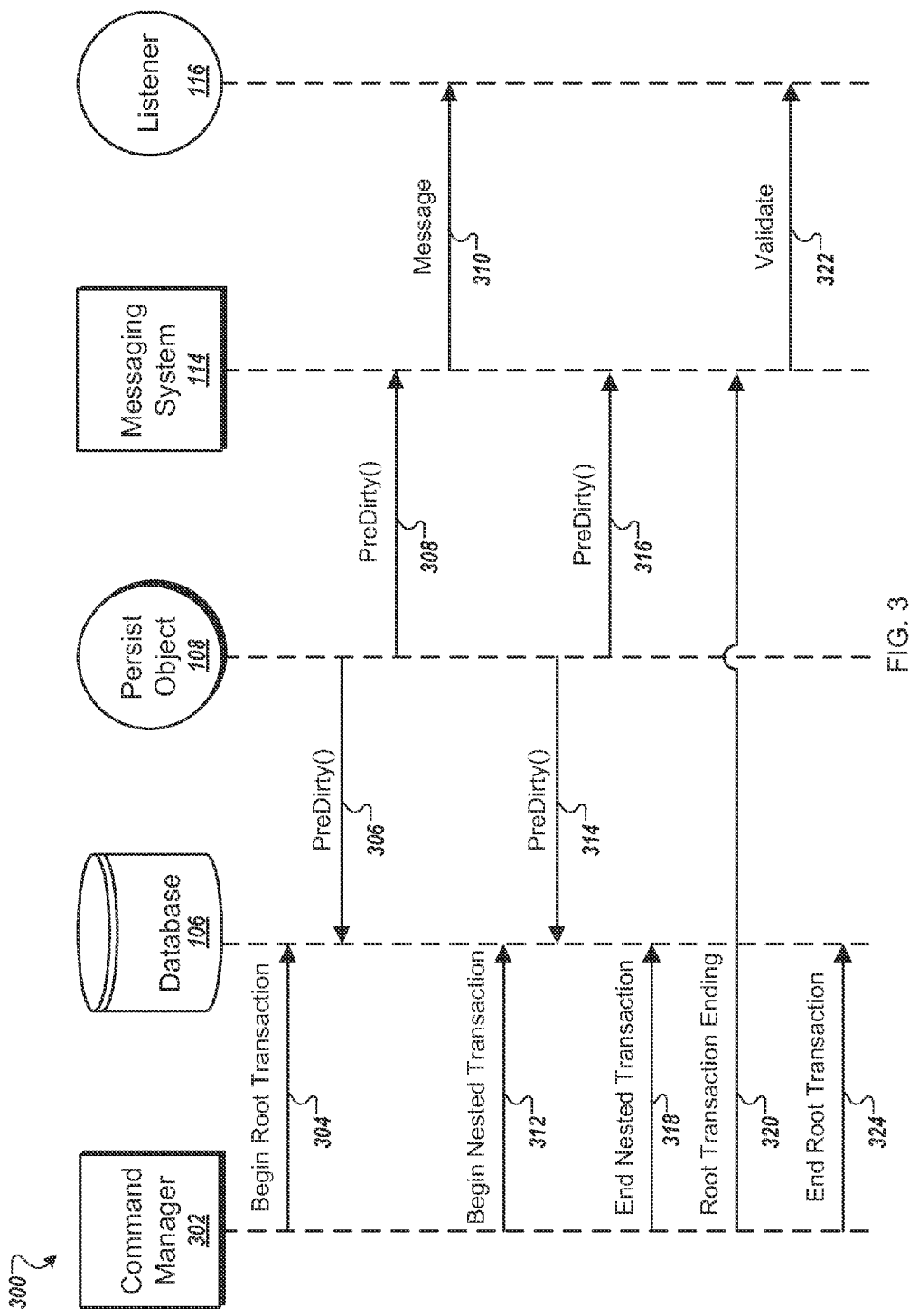
FIG. 3 is a sequence diagram showing an example nested transaction and example interactions with a listener.

The second process segment 250 begins with monitoring a transaction queue (218). The transaction queue, for example, can include any number of nested transactions associated with the root transaction which initiated the first Dirty( ) call. In some implementations, the transaction queue is included within a command manager 302 (as shown in FIG. 3). The messaging system 114, for example, can monitor the transaction queue by intercepting transaction messages. In some implementations, when a transaction is about to complete, the persisted object associated with the transaction is forewarned. The persisted object, for example, can use the forewarning as an opportunity to react to any changes made. In some implementations, the command manager 302 is aware of the messaging system 114 and shares transaction queue information with the messaging system 114.

Once the root transaction has completed (220), the listener object is notified (222). For example, the messaging system 114 can notify the listener object 116 regarding the completion of a transaction made to the persisted object 108. If the messaging system 114 collected a summary of nested transactions (e.g., as described in connection with FIG. 2A), the messaging system 114 can send the summary of nested transactions to the listener object 116 at this time. In some implementations, the listener object is notified when the root transaction is about to complete (e.g., when one event is left within the transaction queue). In some implementations, the listener object is notified only if the listener object made a private copy of persistent data (e.g., operation 216 of process segment 200 as described in connection with FIG. 2A).

If during the process segment 200, the listener object made a private copy of persistent data (216), the listener object can compare the private copy of the persistent data to the modified values of the persistent data stored within memory (224). For example, the listener object can determine which values within the persistent data have been changed and in what manner the persistent data has changed. In some circumstances, if the listener object only stored a portion of the persistent data relevant to one or more registered objects, there may be no changes within the relevant persistent data. If changes have been made to the persistent data relevant to one or more interested objects, the listener object can share this information with the interested objects. For example, the listener object 116 can share the persistent data changes with the added object 118.

The listener object reacts to changes in the persistent data (226). For example, the listener object 116 can issue a message to the added object 118 regarding the completion of the transaction. In some implementations, the listener object 116 forwards a summary of the nested transactions to one or more interested objects. The listener object 116 can, for example, forward a summary of the changes in the persistent data to the added object 118. The listener object can optionally generate one or more additional nested transactions on behalf of one or more interested objects. For example, the listener object can generate a transaction on behalf of a parent interested object to initiate modifications upon one or more child objects. In some implementations, the added object 118 provides the listener object 116 with instructions on how to react to changes in persistent data upon creation of the listener object 116.

FIG. 3 is a sequence diagram 300 showing an example nested transaction and example interactions with the listener object 116. The nested transaction is issued between the command manager 302 and the database 106. The nested transaction relates to the persisted object 108. The messaging system 114 relays information to the listener object 116 regarding the nested transaction. Although only a single nested transaction is illustrated within the root transaction in the sequence diagram 300, a root transaction can contain any number of nested transaction calls. In some implementations, more or fewer elements may be involved in issuing the series of commands between the command manager 302 and the listener object 116. For example, a database messaging system can be invoked to communicate with the messaging system 114.

The command manager 302 issues a begin root transaction call 304 to the database 106. The begin root transaction call 304, for example, can relate to a series of changes about to take place within the persisted object 108. In response to the begin root transaction call 304, the persisted object 108 issues a PreDirty( ) call 306 to the database 106. The PreDirty( ) call 306 is relayed to the messaging system 114 in a PreDirty( ) call 308. In some implementations, the messaging system 114 intercepts the PreDirty( ) call 306 intended for the database 106. In other implementations, a subroutine within the PreDirty( ) call routine issues a message to the messaging system 114 regarding the contents of the PreDirty( ) call 306. The messaging system 114 reviews the PreDirty( ) call 308 to determine the interface, implementation, and/or class involved with the PreDirty( ) call 308. The messaging system 114 determines that the listener object 116 has an interest in the PreDirty( ) call 308. The messaging system 114 determines that the PreDirty( ) call 308 pertains to a root transaction. The messaging system 114 sends a message 310 to the listener object 116 regarding the PreDirty( ) call 308.

The command manager 302 issues a begin nested transaction call 312 to the database 106. In response to the begin nested transaction call 312, the persisted object 108 issues a PreDirty( ) call 314 to the database 106. The persisted object 108 relays the information within the PreDirty( ) call 314 to the messaging system 114 within a PreDirty( ) call 316. The messaging system 114 reviews the PreDirty( ) call 316, determining that the listener object 116 is an interested party. The messaging system 114 determines that the PreDirty( ) call 308 pertains to a nested transaction. The messaging system 114, in some implementations, may collect information regarding the nested transaction on behalf of the listener object 116. In other implementations, the messaging system 114 can issue a message (not shown) to alert the listener object 116 regarding the PreDirty( ) call 316.

The command manager 302 issues an end nested transaction call 318 to the database 106 followed by a root transaction ending call 320 to the messaging system 114. The root transaction ending call 320 may additionally be received by the database 106. The root transaction ending call 320, for example, can be issued by the command manager 302 before the modifications to the persisted object 108 become permanent (e.g., while there is still a chance for the transaction to be undone). In some implementations, rather than receiving a root transaction ending call 320, the messaging system 114 can monitor the system command stack. The messaging system 114, for example, can recognize when the system command stack is about to go empty.

The messaging system 114 sends a validate message 322 to the listener object 116 to alert the listener object 116 of the pending completion of the root transaction. In some implementations, the messaging system 114 sends a summary of all nested transaction changes to the listener object 116 at this time. In some implementations, the messaging system 114 only sends the validate message 322 to the listener object 116 if the listener object 116 made a private copy of persistent data in response to the message 310. For example, the listener object 116 may register the private data copy with the messaging system 114 (e.g., via a message, not illustrated, from the listener object 116 to the messaging system 114 after the listener object 116 receives the message 310). In some implementations, after issuing validate messages to any interested listeners within the system, the messaging system 114 clears all information regarding this transaction.

The listener object 116 receives the validate message 322 and reacts to the changes in the persistent data. In some implementations, the listener object 116 forwards information regarding the change to the persistent data to any objects which have expressed interest in these changes. The listener object 116 or one of the objects the listener object 116 acts on behalf of may additionally issue a command which becomes a further nested transaction for the persisted object 108. Once all of the nested transactions have completed, the command manager 302 sends an end root transaction call 324 to the database 106.

Figure 4:
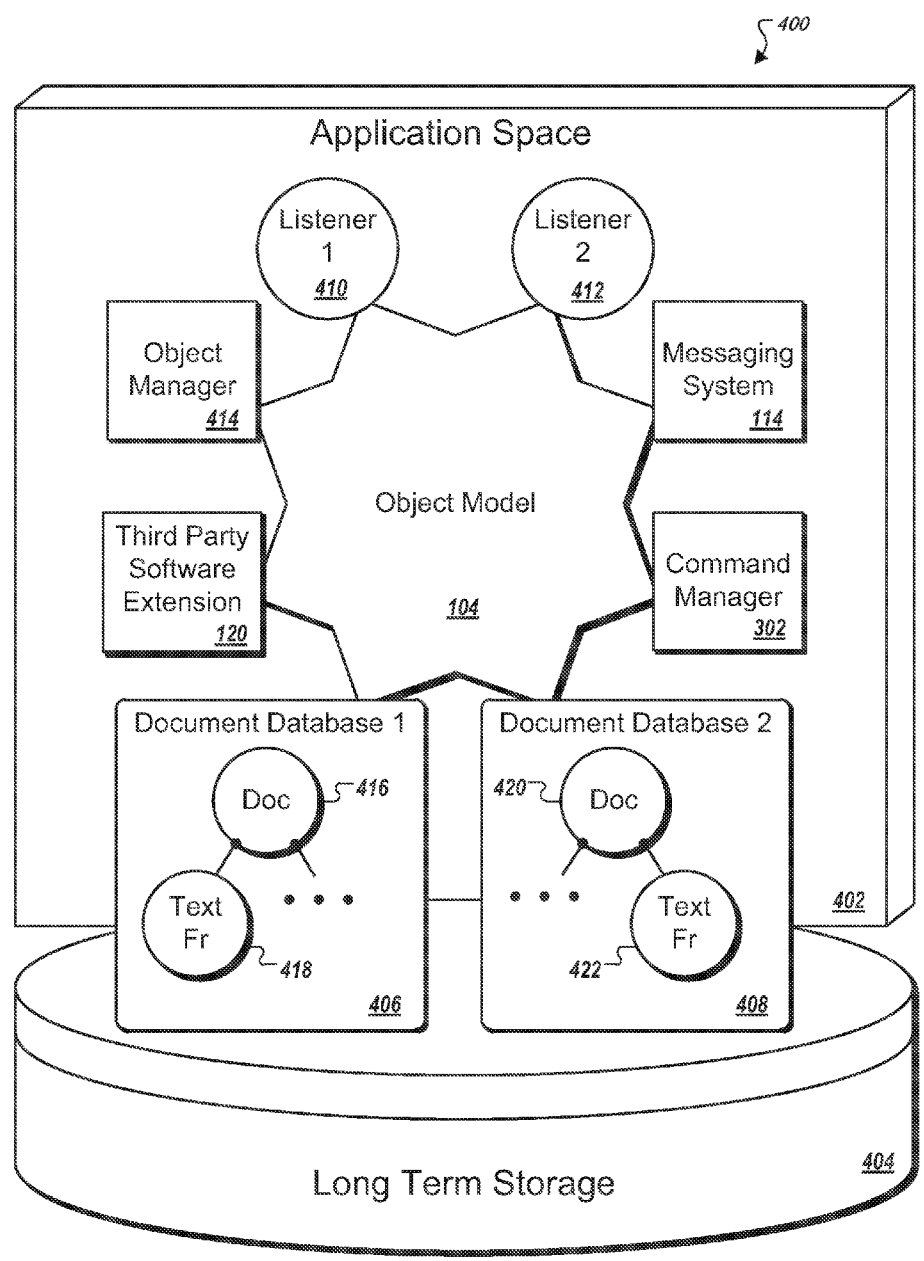
FIG. 4 is a block diagram showing an example conceptual overview of an extensible automatic runtime object management system.

FIG. 4 is a block diagram showing an example conceptual overview of an extensible automatic runtime object management system 400. The extensible automatic runtime object management system 400, for example, can be used to execute the process segments 200 and 250 as described in connection with FIGS. 2A and 2B or to issue the series of function calls and messages as described within the sequence diagram 300 of FIG. 3. The extensible automatic runtime object management system 400 includes an application space 402 where software elements are running and a long term storage device 404 where one or more software programs and one or more databases can be stored. At the heart of the application space 402, the object model 104 describes a system in which the messaging system 114 and one or more listener objects can communicate with one or more databases to provide a means for interested objects to receive notification of changes made to persistent data within the database where the interested objects reside or within an associated database.

The application space 402 includes a first document database 406 and a second document database 408. In some implementations, individual documents can be stored within the extensible automatic runtime object management system 400 in the form of databases. Each document database 406, 408 includes an object hierarchy. An object manager 414 manages the creation and interactions of the objects within both of the document databases 406, 408. In some implementations, objects can be added to and/or modified within the document database 406, 408 by the third party software extension 120.

The first document database 406 has an object hierarchy including a persisted document object 416 and a persisted text frame object 418. Similarly, the second document database 408 has an object hierarchy including a persisted document object 420 and a persisted text frame object 422. In some implementations, the document databases 406, 408 can share class definitions. For example, the document database 406 can include the same or similar interfaces and/or implementations as the document database 408.

When the command manager 302 receives commands pertaining to a transaction which modifies the color of the basic text frame as used by both the document database 406 and the document database 408, for example, the transactions can be issued to a shared interface of both the persisted text frame object 418 and the persisted text frame object 422. Similarly, if both the persisted text frame object 418 and the persisted text frame object 422 include the same persistent interface, and a listener object such as a first listener object 410 or a second listener object 412 is designated to listen for changes to the persisted interface, then the listener can track changes to both the persisted text frame object 418 within the first document database 406 and the persisted text frame object 422 within the second document database 408. For example, a preview document (not shown) can include summary information regarding both the document described by the document database 406 and the document described by the document database 408. The preview document can register a listener object with the messaging system 114 to keep up-to-date regarding the text frame objects contained within both the document database 406 and the document database 408.

FIGS. 5A-5D show example elements and processes for summarizing changes to multiple objects of a given type. The objects, for example, can be created within the extensible automatic runtime object management system 100 as described in connection with FIG. 1A. Objects can be of a given type if they include the same class identifier (e.g., as described in connection with FIG. 1B). When changes are made across two or more objects of a given type (e.g., all text frames within a document), it may be desirable to be alerted to the changes once the changes have propagated across all of the objects. An interested object can register a listener object with the messaging system 114 to be alerted in summary form upon completion of a series of transactions which change all objects of a given type.

Figure 5A:
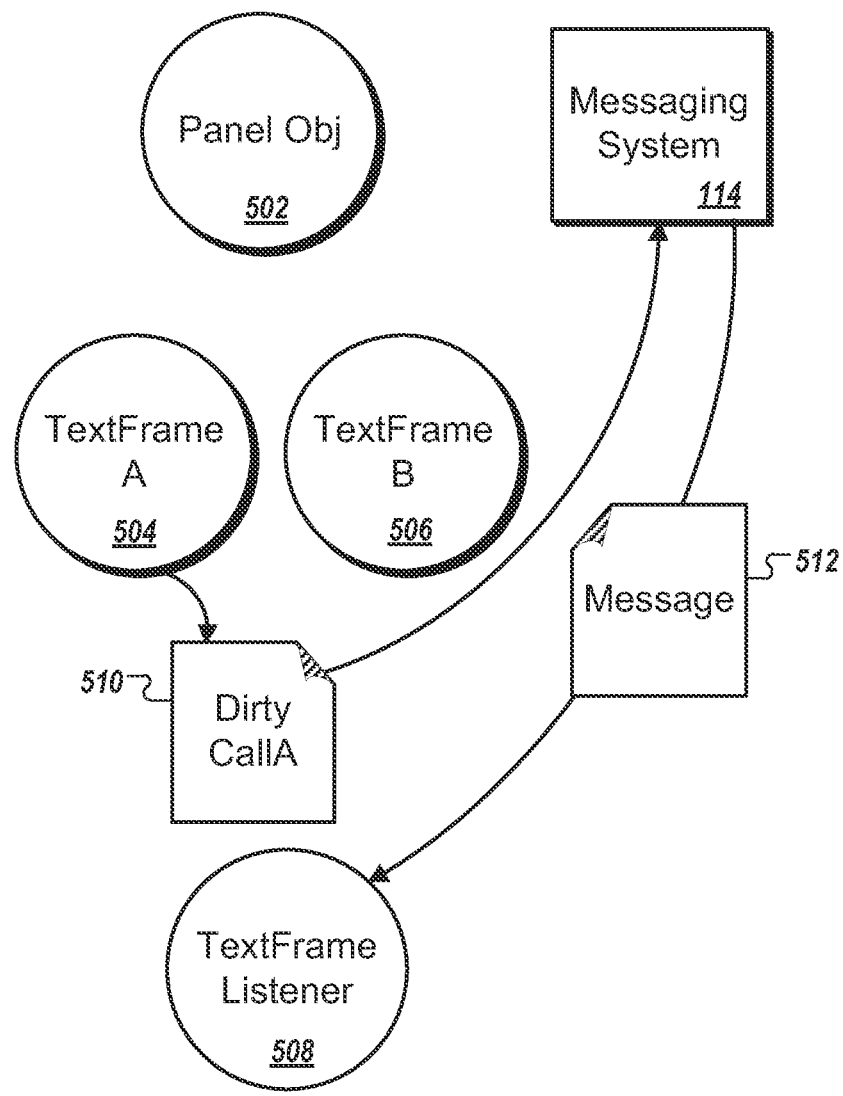
FIGS. 5A-5D show example elements and processes for summarizing changes to multiple objects of a given type.

As shown in FIG. 5A, a persisted panel object 502 is interested in changes made to both a persisted text frame A object 504 and a persisted text frame B object 506. The messaging system 114 generates a text frame listener object 508 to listen for changes made to all persisted text frame objects of the same type (e.g., both the persisted text frame A object 504 and the persisted text frame B object 506). The persisted text frame objects 504, 506 are not hierarchically related to the panel object 502. The panel object 502, for example, may display information regarding the contents of all text frames, such as thumbnail images of the contents of the text frames, timestamps regarding the most recent modification of each text frame, etc. If a transaction causes changes to more than one text frame, the panel object 502 may prefer to be updated once all changes have been made. For example, if an import transaction occurs within the database system, the panel object 502 can receive a summary from the messaging system 114 regarding which text frame objects have been added, modified, deleted, etc. during the course of the import transaction. Without a summary method in place, the panel object 502 may react to either individual changes within individual text frames or, using the methods described thus far regarding the messaging system 114, a summarized set of changes pertaining to each individual text frame.

When the persisted text frame A object 504 is modified, the messaging system 114 receives a Dirty( ) call A 510 from the persisted text frame A object 504. The messaging system 114 reviews the contents of the Dirty( ) call A 510 and discovers that the Dirty( ) call A 510 is of interest to the text frame listener object 508. In some implementations, the messaging system 114 determines whether or not the Dirty( ) call A 510 is the first Dirty( ) call received from the persisted text frame A object 504 (e.g., the Dirty( ) call was triggered by the beginning of a root transaction). The messaging system 114 constructs a message 512 regarding the Dirty( ) call A 510 and issues the message 512 to the text frame listener object 508.

Figure 5B:
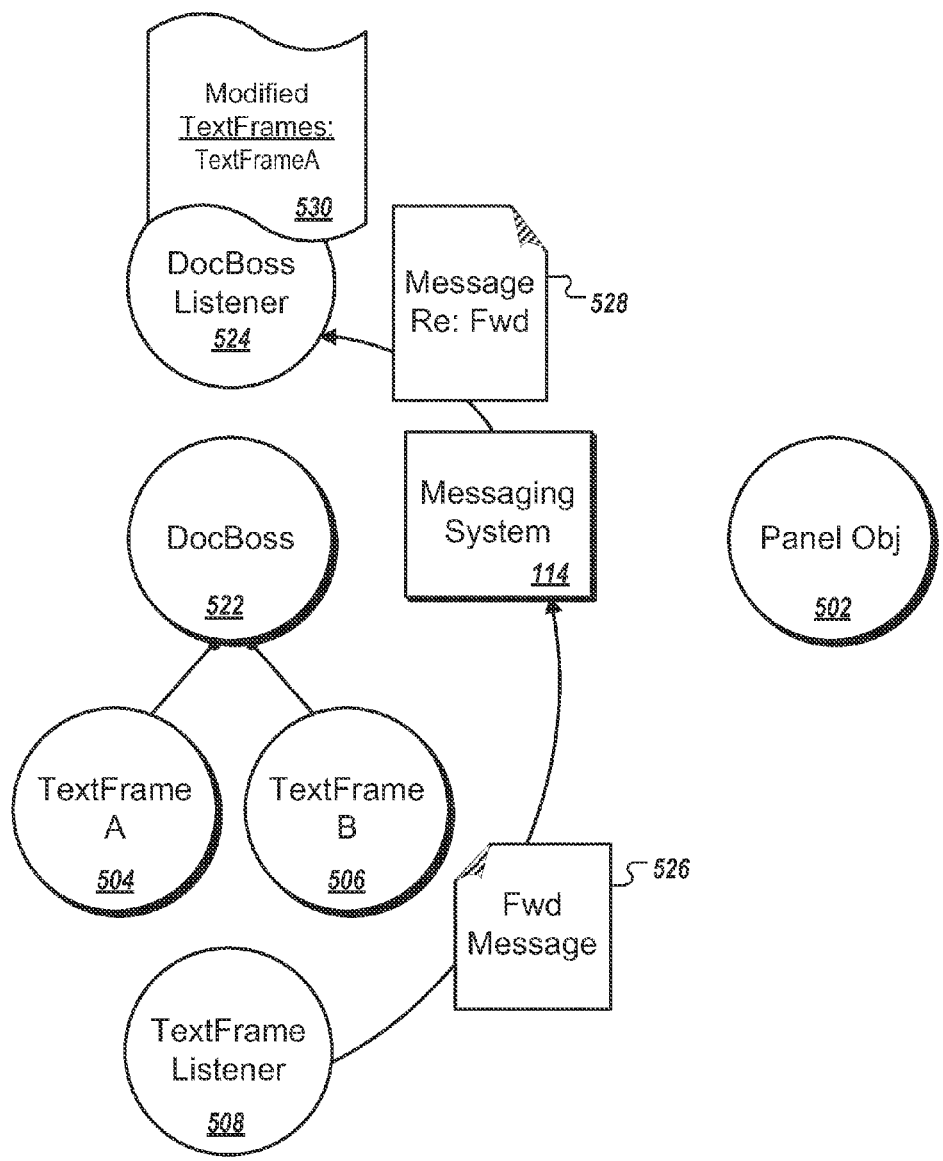

As shown in FIG. 5B, the persisted text frame A object 504 and the persisted text frame B object 506 share a parent object; a persisted document boss object 522. In some implementations, the persisted document boss object 522 is a root object (e.g., only one object of this type exists within the document database). As such, for example, the persistent document boss object 522 may be positioned further up in the hierarchy than a direct parent of the persisted text frame A object 504 and the persisted text frame B object 506. The parent-child hierarchy displayed in FIG. 5B is for sake of simplicity.

A document boss listener object 524 can be created to listen for messages regarding modified text frame objects. In this example, the document boss listener object 524 is generated with an interest in a particular type of synthesized message. A synthesized message refers to a message type generated by the messaging system 114. In some implementations, the message type can be determined through message header information.

Once the text frame listener object 508 has received the message 512 from the messaging system 114 regarding the Dirty( ) call A 510 (e.g., as described in connection with FIG. 5A), the text frame listener object 508 can forward the message 512 to the messaging system 114 in the form of a forwarded message 526 associated with the persisted document boss object 522. Upon receipt of the forwarded message 526, the messaging system 114 can alert the document boss listener object 524 to the forwarded message 526 in a message regarding the forwarded message 528 (e.g., a synthesized message).

When the document boss listener object 524 receives the message regarding the forwarded message 528, the document boss listener object 524 can add the text frame A object 504 to a summary list of modified text frames 530. In some implementations, if this is the first text frame added to the summary list of modified text frames 530, the document boss listener 524 can issue a message (not shown) to the persisted panel object 502 regarding the beginning of changes being made to the set of persisted text frame objects 504, 506.

Figure 5C:
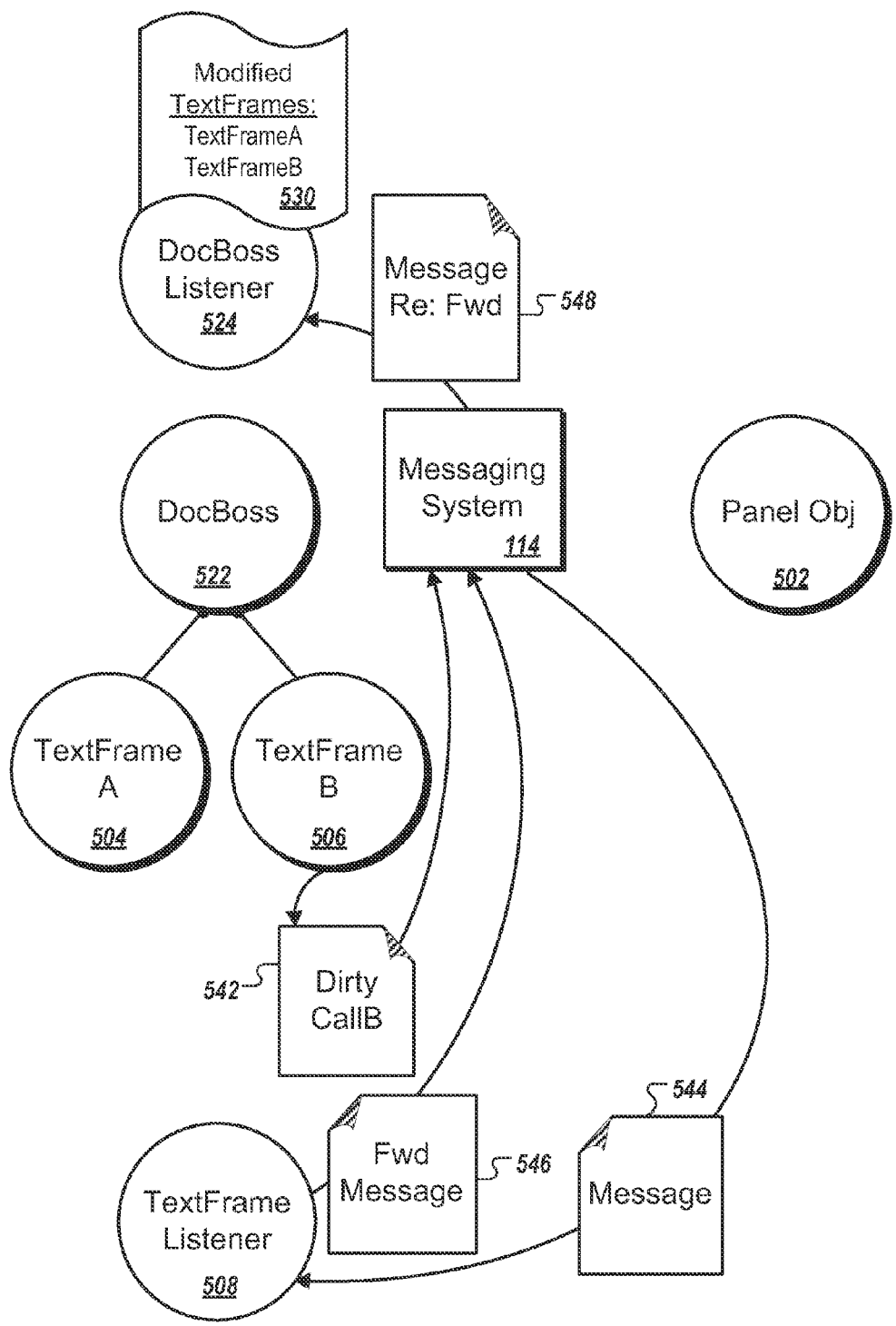

As shown in FIG. 5C, the persisted text frame B object 506 issues a Dirty( ) call B 542. The messaging system 114 receives the Dirty( ) call B 542 from the persisted text frame B object 506. The messaging system 114 reviews the contents of the Dirty( ) call B 542 and discovers that the Dirty( ) call B 542 is of interest to the text frame listener object 508. The messaging system 114 may optionally determine whether or not the Dirty( ) call B 542 is the first Dirty( ) call originating from the persisted text frame B object 506. The messaging system 114 constructs a message 544 regarding the Dirty( ) call B 542 and issues the message 544 to the text frame listener object 508.

Once the text frame listener object 508 has received the message 544 from the messaging system 114 regarding the Dirty( ) call B 542, the text frame listener object 508 can forward the message 544 to the messaging system 114 in the form of a forwarded message 546 associated with the persisted document boss object 522. Upon receipt of the forwarded message 526, the messaging system 114 can alert the document boss listener object 524 to the forwarded message 546 in a message regarding the forwarded message 548.

When the document boss listener object 524 receives the message regarding the forwarded message 548, the document boss listener object 524 can add the text frame B object 506 to the summary list of modified text frames 530.

Figure 5D:
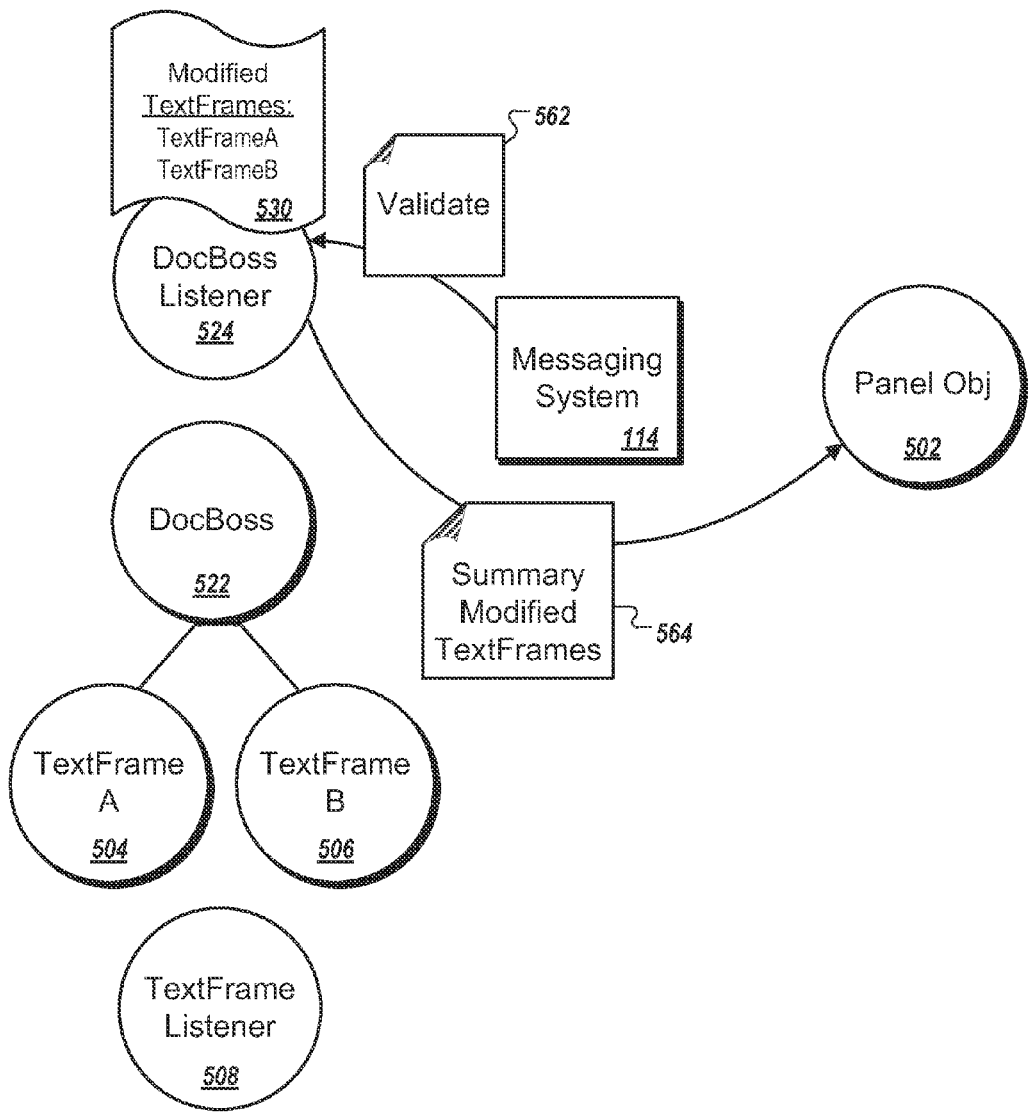

As shown in FIG. 5D, at a later point in time, the messaging system 114 issues a validate message 562 to the document boss listener 524. In some implementations, the validate message 562 is issued upon receipt of a root transaction ending message from the command manager 302 (e.g., as described in connection with FIG. 3). The validate message 562, for example, can contain a summary of changes made to both the persisted text frame A object 504 and the persisted text frame B object 506 during the course of any nested transactions.

The document boss listener 524 receives the validate message 562, and generates a summary of modified text frames message 564. The summary of modified text frames message 564, for example, can contain information regarding changes to persistent data associated with transactions occurring on both the persisted text frame A object 504 and the is persisted text frame B object 506. The document boss listener object 524 sends the summary of modified text frames message 564 to the persisted panel object 502. The persisted panel object 502 can now react to the changes made to all of the persisted text frame objects. In some implementations, the document boss listener object 524 can also react to the validate message 562 by issuing one or more transactions on behalf of the persisted panel object 502.

White FIGS. 5A through 5D describe one example of using a listener object which listens for a specific type of synthesized messages, other embodiments of listeners interested in synthesized messages are possible. In some implementations, one or more listener objects can be generated to listen for synthesized messages related to hierarchical changes. For example, when a parent or grandparent object of a related object is about to be removed, the related object may want immediate notification of the pending removal. A hierarchical synthesized message can be issued to the listener whenever deletions to the object model hierarchy are about to take place. The messaging system 114, for example, can learn about the deletions to the object model hierarchy through the command manager 302 (as described in connection with FIG. 3).

Figure 6A:
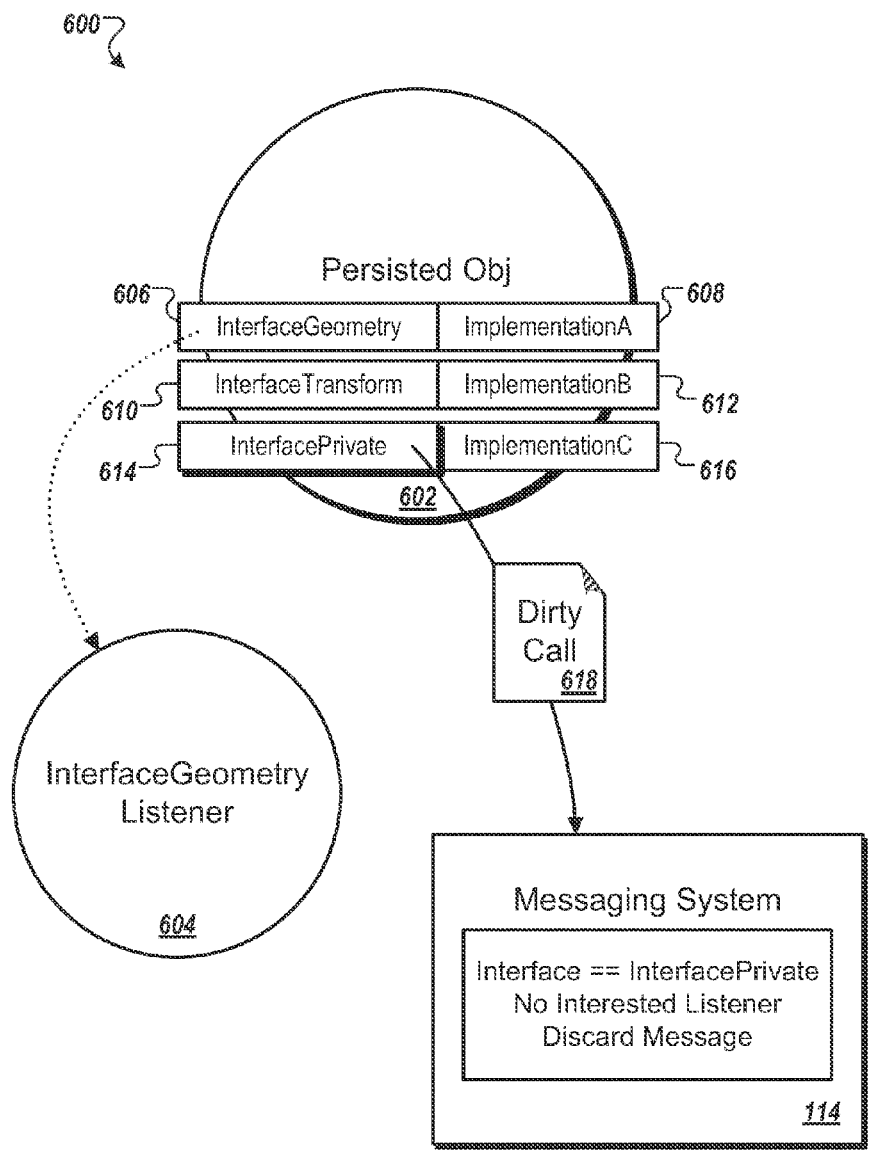
FIGS. 6A-6B show example elements and processes for identifying and reacting to changes to an object having both a private (generally unknown) persistent interface and a public (generally known) non-persistent interface.
Figure 6B:
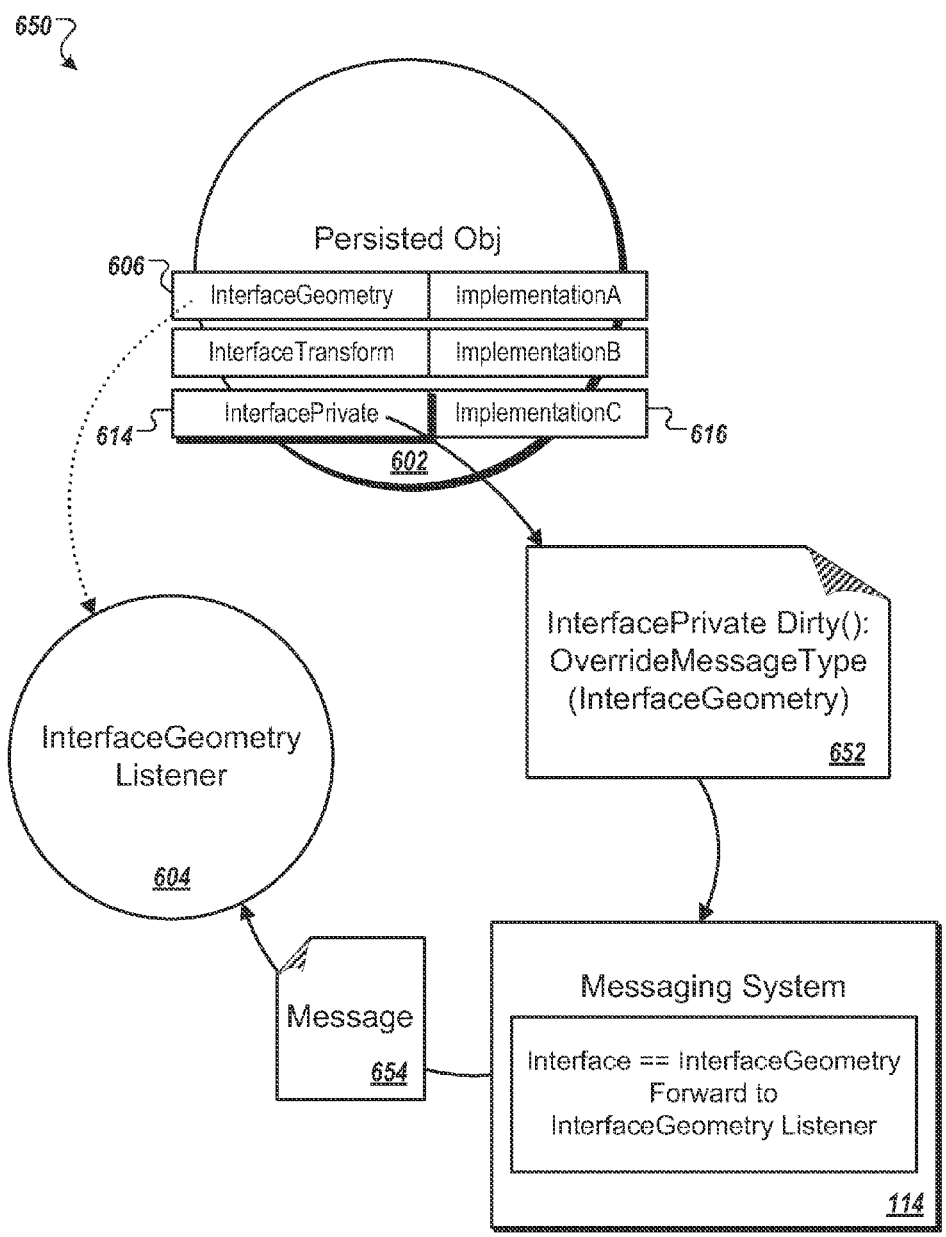

FIGS. 6A-6B show example elements and processes for identifying and reacting to changes to a persisted object 602 having both a private (generally unknown) persistent interface and a public (generally known) non-persistent interface. When a listener object registers with the messaging system 114, the listener object can request notification regarding changes made to a particular interface type. A set of interfaces can be well-known within a system (e.g., well-documented and/or commonly used within the object model). In some implementations, any interface type can be implemented to be either persistent or non-persistent. Individual developers can also choose to create private interface types which can also be implemented in either a persistent or a non-persistent manner. Because the messaging system 114 depends upon Dirty( ) calls originating from persistent interfaces, if a well-known interface is implemented as a non-persistent interface, the messaging system 114 will not be able to determine when changes are made through this interface.

As shown in FIG. 6A, a block diagram 600 illustrates the problem with listening to an object which has not implemented the known interface in a persistent manner. The persisted object 602 contains three interfaces: a known interface InterfaceGeometry 606, a known interface InterfaceTransform 610, and an unknown interface InterfacePrivate 614. The known interfaces InterfaceGeometry 606 and InterfaceTransform 610 are implemented as non-persistent interfaces using a first implementation A 608 and a second implementation B 612. The unknown interface InterfacePrivate 614 is implemented as a persistent interface using an implementation C 616.

An InterfaceGeometry listener object 604 is registered with the messaging system 114 to listen for changes on the known interface InterfaceGeometry 606. The persisted object 602 will not issue a Dirty( ) call when a change is made through the interface InterfaceGeometry 606, because the implementation A 608 associated with the InterfaceGeometry 606 does not implement the interface InterfaceGeometry 606 as a persistent interface. The persisted object 602 will only issue Dirty( ) calls when changes are made upon the persistent interface associated with the persisted object 602, namely the interface InterfacePrivate 614.

When the persisted object 602 issues a Dirty( ) call 618 through the interface InterfacePrivate 614, the messaging system 114 determines whether or not a registered listener is interested in the Dirty( ) call 618. Because the interface associated with the Dirty( ) call 618 is the interface InterfacePrivate 614, the messaging system discards the message. If the interface InterfacePrivate 614 affects the persistent data also associated with the interface InterfaceGeometry 606, any interested object associated with the InterfaceGeometry listener object 604 will miss learning about these changes.

FIG. 6B shows a block diagram 650 illustrating a method of learning about changes to a persisted object even if it does not include any well-known persistent interfaces. The persisted object 602 and the InterfaceGeometry listener 604 are as described in connection with FIG. 6A. The interface InterfacePrivate 614 issues an InterfacePrivate Dirty( ) call 652. Within the InterfacePrivate Dirty( ) call 652, the implementation ImplementationC 616 has included a message type override. The message type received by the messaging system 114 has been overridden to type InterfaceGeometry. The implementation ImplementationC 616 can override the message type, for example, because persistent data commonly associated with a known interface (e.g., the interface InterfaceGeometry 606) is going to be modified using the unknown interface. In some implementations, the implementation ImplementationC 616 can override the type within each Dirty( ) call depending upon the type of persistent data modified by the specific call made to interface InterfacePrivate 614. The InterfacePrivate Dirty( ) call 652, in some implementations, can be sent specifically for the messaging system 114. For example, a Dirty( ) call issued by the persisted object 602 and destined for the database 106 (e.g., as shown in FIG. 1A) can include the InterfacePrivate message type within the header, while a corresponding message destined for the messaging system 114 (e.g., as generated by the Dirty( ) call software mechanism) can include the interface InterfaceGeometry 606 as the interface type. In other implementations, the implementation ImplementationC 616 can override all Dirty( ) calls issued by the persisted object 602 to replace the message type to relate to the interface InterfaceGeometry 606.

When the messaging system 114 receives the InterfacePrivate Dirty( ) call 652, the messaging system determines that the InterfaceGeometry listener 604 is interested in the InterfacePrivate Dirty( ) call 652. The messaging system 114 issues a message 654 to the InterfaceGeometry listener object 604 regarding the InterfacePrivate Dirty( ) call 652.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes aback-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method of managing persistent data in an extensible automatic runtime object management system, the method comprising:
    receiving input indicating a listener object and an interface for an object class corresponding to a persisted object of an object model retained by a database;
    recording information indicating that the listener object has an interest in persistent data associated with the interface for the object class corresponding to the persisted object;
    in connection with a transaction with the database and responsive to receiving a call that includes a change to the persistent data managed by the database, determining whether the interface for the object class corresponding to the persisted object is associated with the call, the call being generated responsive to an input by a third-party developer;
    communicating with the listener object responsive to determining that the interface for the object class corresponding to the persisted object is associated with the call; and
    causing the listener object to compare a private copy of the change to the persistent data with a recorded state of the persistent data, the private copy of the change to the persistent data being created and registered by the listener object and including values within the persistent data that are determined to change.

2. The method of claim 1, wherein the call alerts the database before committing the change to the persistent data managed by the database, the determining comprising checking whether the call is a first call received, and the communicating comprising sending a message to the listener object responsive to determining that the call is the first call received for the interface with the change.

3. The method of claim 2, the communicating comprising, responsive to completing the transaction with the database, notifying the listener object to enable the listener object to react to the change in the persistent data.

4. The method of claim 1, further comprising causing the listener object to store the private copy of the change to the persistent data in response to the communicating.

5. The method of claim 3, the transaction comprising a root transaction and one or more nested transactions, the notifying of the listener object comprising imparting to the listener object context information indicating one or more messages sent to the listener object during the transaction, and the notifying of the listener object occurring at an end phase of the root transaction.

6. The method of claim 1, the listener object comprising a first listener, the receiving comprising receiving input indicating a second listener and a message type for an object class corresponding to an intermediary object, and the method further comprises:
    receiving a call from the first listener indicating the message type for the object class corresponding to the intermediary object; and
    communicating with the second listener in response to the received call.

7. The method of claim 1, further comprising receiving, from the listener object, the private copy of the persistent data that includes a modification to the persisted object.

8. The method of claim 1, further comprising causing the listener object to communicate the private copy to an intermediary object, the intermediary object accessible by the third-party developer.

9. The method of claim 1, further comprising causing the listener object to send the private copy to an intermediary object, the intermediary object being capable of storing the private copy.

10. A computer-readable medium encoding a computer program product that causes data processing apparatus to perform operations comprising:
    receiving input indicating a listener object and an interface for an object class corresponding to a persisted object of an object model retained by a database;
    recording information indicating that the listener object has an interest in persistent data associated with the interface for the object class corresponding to the persisted object;
    in connection with a transaction with the database and responsive to receiving a call that includes a change to the persistent data managed by the database, determining whether the interface for the object class corresponding to the persisted object is associated with the call, the call being generated responsive to an input by a third-party developer;
    communicating with the listener object responsive to determining that the interface for the object class corresponding to the persisted object is associated with the call; and
    causing the listener object to compare a private copy of the change to the persistent data with a recorded state of the persistent data, the private copy of the change to the persistent data being created and registered by the listener object and including values within the persistent data that are determined to change.

11. The computer-readable medium of claim 10, wherein the call alerts the database before committing the change to the persistent data managed by the database, the determining comprising checking whether the call is a first call received, and the communicating comprising sending a message to the listener object.

12. The computer-readable medium of claim 11, the communicating comprising, responsive to completing the transaction with the database, notifying the listener object to enable the listener object to react to the change in the persistent data.

13. The computer-readable medium of claim 12, the transaction comprising a root transaction and one or more nested transactions, the notifying of the listener object comprising imparting to the listener object context information indicating one or more messages sent to the listener object during the transaction, and the notifying of the listener object occurring at an end phase of the root transaction.

14. The computer-readable medium of claim 10, further comprising causing the listener object to notify the third-party developer of additional changes to the persistent data that correspond to the call.

15. The computer-readable medium of claim 10, the communicating comprising sending a message to the listener object responsive to determining that the call is a first call received that includes the change, the message indicating that an interface associated with the persisted object is to undergo a modification.

16. The computer-readable medium of claim 10, further comprising causing the listener object to determine the values within the persistent data that change.

17. A system comprising:
a user interface device; and
one or more computers configured to interact with the user interface device and to perform operations comprising:
receiving input indicating a listener object and an interface for an object class corresponding to a persisted object of an object model retained by a database;
recording information indicating that the listener object has an interest in persistent data associated with the interface for the object class corresponding to the persisted object;
in connection with a transaction with the database and responsive to receiving a call that includes a change to the persistent data managed by the database, determining whether the interface for the object class corresponding to the persisted object is associated with the call, the call being generated responsive to an input by a third-party developer; and
communicating with the listener object responsive to determining that the interface for the object class corresponding to the persisted object is associated with the call; and
causing the listener object to compare a private copy of the change to the persistent data with a recorded state of the persistent data, the private copy of the change to the persistent data being created and registered by the listener object and including values within the persistent data that are determined to change.

18. The system of claim 17, wherein the call alerts the database before committing the change to the persistent data managed by the database, the determining comprising checking whether the call is a first call received, and the communicating comprising sending a message to the listener object.

19. The system of claim 17, responsive to the communicating causing the listener object to notify the third party developer of a potential change in the persistent data related to a call that is not generated by the third party developer.

20. The system of claim 19, the transaction comprising a root transaction and one or more nested transactions, the notifying of the listener object comprising imparting to the listener object context information indicating one or more messages sent to the listener object during the transaction, and the notifying of the listener object occurring at an end phase of the root transaction.

21. The system of claim 17, wherein the private copy of the change to the persistent data is created by the listener object in response to the communicating.

22. The system of claim 17, wherein the one or more computers comprise a server operable to interact with the user interface device through a data communication network, and the user interface device is operable to interact with the server as a client.

23. The system of claim 17, wherein the one or more computers comprises one personal computer, and the personal computer comprises the user interface device.

\* \* \* \* \*